(12) United States Patent
Lim et al.

(10) Patent No.: US 9,323,381 B2
(45) Date of Patent: Apr. 26, 2016

(54) TOUCH SCREEN DRIVER AND DISPLAY DEVICE FOR DRIVING A TOUCH SCREEN

(71) Applicant: LG DISPLAY CO., LTD, Seoul (KR)

(72) Inventors: Kyusam Lim, Goyang-si (KR); Chulsang Jang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 334 days.

(21) Appl. No.: 13/869,738

(22) Filed: Apr. 24, 2013

(65) Prior Publication Data

US 2013/0278525 A1 Oct. 24, 2013

(30) Foreign Application Priority Data

Apr. 24, 2012 (KR) .................. 10-2012-0042655

(51) Int. Cl.
G06F 3/045 (2006.01)
G06F 3/044 (2006.01)
G06F 3/041 (2006.01)

(52) U.S. Cl.
CPC .............. *G06F 3/0416* (2013.01); *G06F 3/044* (2013.01)

(58) Field of Classification Search
CPC ... G06F 3/044; G06F 3/0416; G06F 3/04886; G06F 2203/04803
USPC ........................................ 345/174; 178/18.06
See application file for complete search history.

(56) References Cited

U.S. PATENT DOCUMENTS

| 8,810,543 | B1 * | 8/2014 | Kurikawa ...................... 345/173 |
|---|---|---|---|
| 2008/0158177 | A1 * | 7/2008 | Wilson et al. .................. 345/173 |
| 2009/0250269 | A1 * | 10/2009 | Hung et al. ................. 178/18.06 |
| 2009/0267903 | A1 * | 10/2009 | Cady et al. ..................... 345/173 |
| 2010/0039396 | A1 * | 2/2010 | Ho et al. ......................... 345/173 |
| 2010/0156795 | A1 * | 6/2010 | Kim et al. ...................... 345/174 |
| 2010/0283760 | A1 * | 11/2010 | Leung ..................... G06F 3/044 345/174 |
| 2010/0328237 | A1 * | 12/2010 | Chang et al. .................. 345/173 |
| 2011/0122088 | A1 * | 5/2011 | Lin et al. ........................ 345/174 |
| 2011/0148435 | A1 * | 6/2011 | Schwartz et al. ............. 324/658 |
| 2011/0267304 | A1 * | 11/2011 | Simmons ................ G06F 3/044 345/174 |
| 2012/0056662 | A1 * | 3/2012 | Wilson .................. G06F 3/0412 327/517 |
| 2012/0256852 | A1 * | 10/2012 | Van Antwerpen et al. ... 345/173 |

FOREIGN PATENT DOCUMENTS

JP 238240 A 11/2011

* cited by examiner

*Primary Examiner* — Adam J Snyder
(74) *Attorney, Agent, or Firm* — Birch, Stewart, Kolasch & Birch, LLP

(57) ABSTRACT

A touch screen driver includes a plurality of integrated circuits for dividedly driving a touch screen. One of the plurality of integrated circuits, which generates a driving signal to be supplied to Tx lines of the touch screen, transmits a synchronization signal synchronized with the driving signal to other integrated circuit. The other integrated circuit receiving the synchronization signal receives charges of the touch sensors through Rx lines of the touch screen in response to the synchronization signal.

16 Claims, 11 Drawing Sheets

TOUCH SCREEN DRIVER AND DISPLAY DEVICE FOR DRIVING A TOUCH SCREEN

This application claims the benefit of Korean Patent Application No. 10-2012-0042655 filed on Apr. 24, 2012 in Republic of Korea, the entire contents of which is incorporated herein by reference for all purposes as if fully set forth herein.

BACKGROUND OF THE INVENTION

1. Field of the Invention

Embodiments of the invention relate to a touch screen, and more particularly, to a touch screen driver for dividedly driving a touch screen.

2. Discussion of the Related Art

User interface (UI) is configured so that people (users) can easily control various electronic devices as they desire. Examples of the user interface include a keypad, a keyboard, a mouse, an on-screen display (OSD), and a remote controller having an infrared communication function or a radio frequency (RF) communication function. User interface technologies have continuously expanded to increase user's sensibility and handling convenience. The user interface has been recently developed to include touch UI, voice recognition UI, 3D UI, etc.

The touch UI has been necessarily used in portable information appliances. The touch UI has been implemented by a method for forming a touch screen on the screen of a display device.

A mutual capacitance touch screen includes Tx lines, Rx lines crossing the Tx lines, and touch sensors formed at crossings of the Tx lines and the Rx lines. Each of the touch sensors has a mutual capacitance.

A touch screen driver for driving the mutual capacitance touch screen supplies a driving signal to the Tx lines, and receives charges of the touch sensors through the Rx lines. The touch screen driver senses changes in voltages charged to the touch sensors before and after a touch operation to decide whether or not a conductive material touches the touch screen and to decide a touch position when the conductive material touches the touch screen. The touch screen driver is integrated into an integrated circuit called a readout integrated circuit (ROIC) and is connected to the touch screen.

In general, one integrated circuit is connected to one touch screen. The integrated circuit includes a Tx channel module, which is connected to the Tx lines and supplies the driving signal to the Tx lines, and an Rx channel module, which is connected to the Rx lines and receives charges of the touch sensors through the Rx lines. The integrated circuit has to include Tx channels equal to or greater than the number of Tx lines in the touch screen and Rx channels equal to or greater than the number of Rx lines in the touch screen, so as to sense all of the touch sensors of the touch screen.

When a resolution and the size of the touch screen increase, the number of Tx channels and the number of Rx channels of the touch screen increase. Thus, a new integrated circuit capable of accepting an increase in the resolution and the size of the touch screen increase has to be developed.

SUMMARY OF THE INVENTION

Embodiments of the invention provide a touch screen driver capable of driving a touch screen having a plurality of channels using an integrated circuit having a relatively small number of channels.

In one aspect, there is a touch screen driver for driving a touch screen including Tx lines, Rx lines and touch sensors formed at crossings of the Tx lines and the Rx lines. The touch screen driver includes a plurality of integrated circuits configured to dividedly drive the touch screen. One of the plurality of integrated circuits which generates a driving signal to be supplied to the Tx lines transmits a synchronization signal synchronized with a rising edge of the driving signal to other integrated circuit, and the other integrated circuit receiving the synchronization signal receives charges of the touch sensors through the Rx lines in response to the synchronization signal. The touch screen driver further includes a touch recognition module configured to analyze touch raw data received from each of the plurality of integrated circuits, estimate coordinates of a touch input position, and output touch coordinate data. The touch recognition module is embedded in one of the plurality of integrated circuits.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
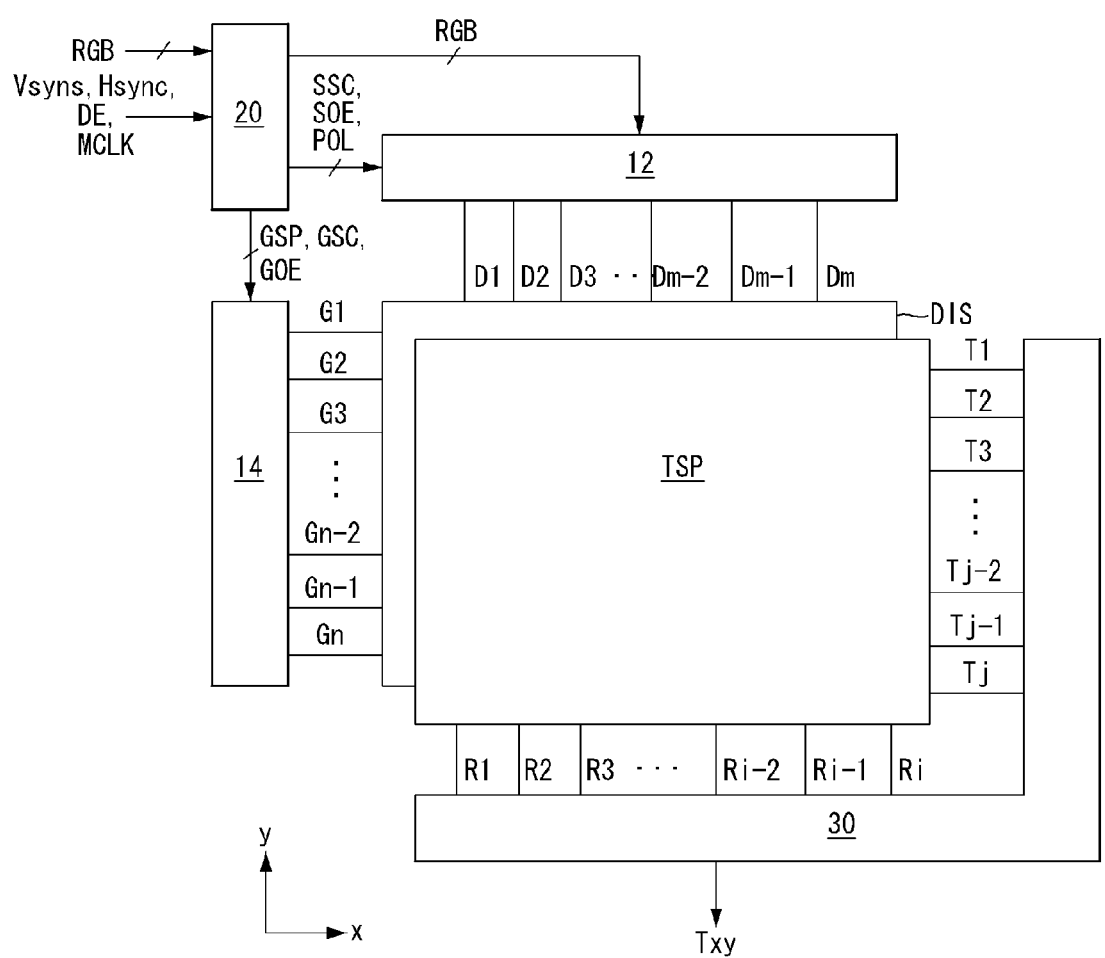
FIG. 1 is a block diagram of a display device according to an example embodiment of the invention.
Figure 2:
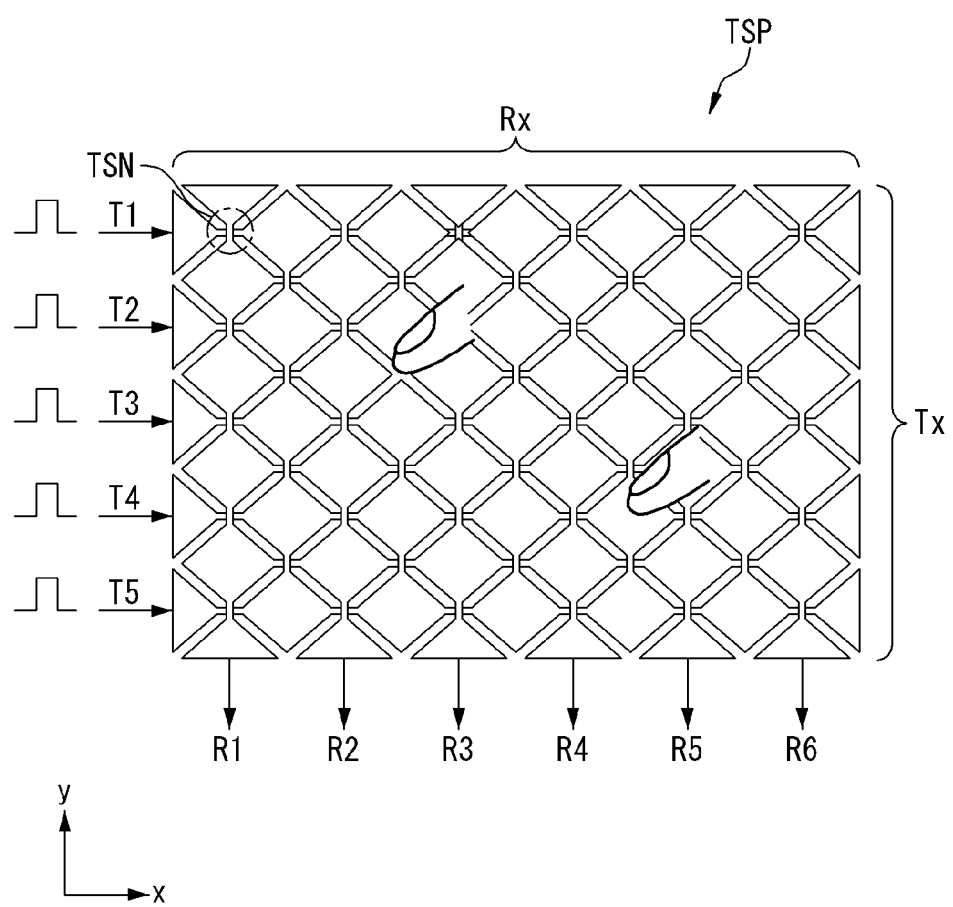
FIG. 2 is a plane view enlarging a portion of a touch screen shown in FIG. 1.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

As shown in FIGS. 1 to 5, a display device according to an example embodiment of the invention includes a display panel DIS, a display driver, a touch screen TSP, a touch screen driver 30, and the like.

The display device according to the embodiment of the invention may be implemented based on a flat panel display, such as a liquid crystal display (LCD), a field emission display (FED), a plasma display panel (PDP), an organic light emitting display, and an electrophoresis display (EPD). In the following description, the embodiment of the invention will be described using the liquid crystal display as an example of the flat panel display. Other flat panel displays may be used.

The display panel DIS includes a lower substrate GLS2, an upper substrate GLS1, and a liquid crystal layer formed between the lower substrate GLS2 and the upper substrate GLS1. The lower substrate GLS2 of the display panel DIS includes a plurality of data lines D1 to Dm, where m is a natural number, a plurality of gate lines (or scan lines) G1 to Gn crossing the data lines D1 to Dm, where n is a natural number, a plurality of thin film transistors (TFTs) formed at crossings of the data lines D1 to Dm and the gate lines G1 to Gn, a plurality of pixel electrodes for charging liquid crystal cells to a data voltage, a plurality of storage capacitors, each of which is connected to the pixel electrode and holds a voltage of the liquid crystal cell, etc. The TFTs are turned on in response to a gate pulse (or a scan pulse) from the gate lines G1 to Gn, thereby supplying the voltage from the data lines D1 to Dm to the pixel electrodes of the liquid crystal cells.

The upper substrate GLS1 of the display panel DIS may include black matrixes, color filters, etc. Polarizing plates POL1 and POL2 are respectively attached to the upper and lower substrates GLS1 and GLS2 of the display panel DIS. Alignment layers for setting a pre-tilt angle of liquid crystals are respectively formed on the inner surfaces contacting the liquid crystals in the upper and lower substrates GLS1 and GLS2 of the display panel DIS. A column spacer is formed between the upper and lower substrates GLS1 and GLS2 of the display panel DIS to keep cell gaps of the liquid crystal cells constant.

A backlight unit (not shown) may be disposed in the rear of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, and a fringe field switching (FFS) mode.

The display driver includes a data driving circuit 12, a scan driving circuit 14, and a display timing controller 20. The display driver writes a video data voltage of an input image to pixels of the display panel DIS. The data driving circuit 12 converts digital video data RGB received from the display timing controller 20 into positive and negative analog gamma compensation voltages and outputs the data voltages. The data driving circuit 12 supplies the data voltages to the data lines D1 to Dm. The scan driving circuit 14 sequentially supplies the gate pulse synchronized with the data voltage to the gate lines G1 to Gn and selects lines of the display panel DIS to which the data voltages are written.

The display timing controller 20 receives timing signals, such as a vertical sync signal Vsync, a horizontal sync signal Hsync, a data enable signal DE, and a main clock MCLK, from an external host system. The display timing controller 20 generates a data timing control signal and a scan timing control signal for respectively controlling operation timing of the data driving circuit 12 and operation timing of the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, etc.

Figure 3:
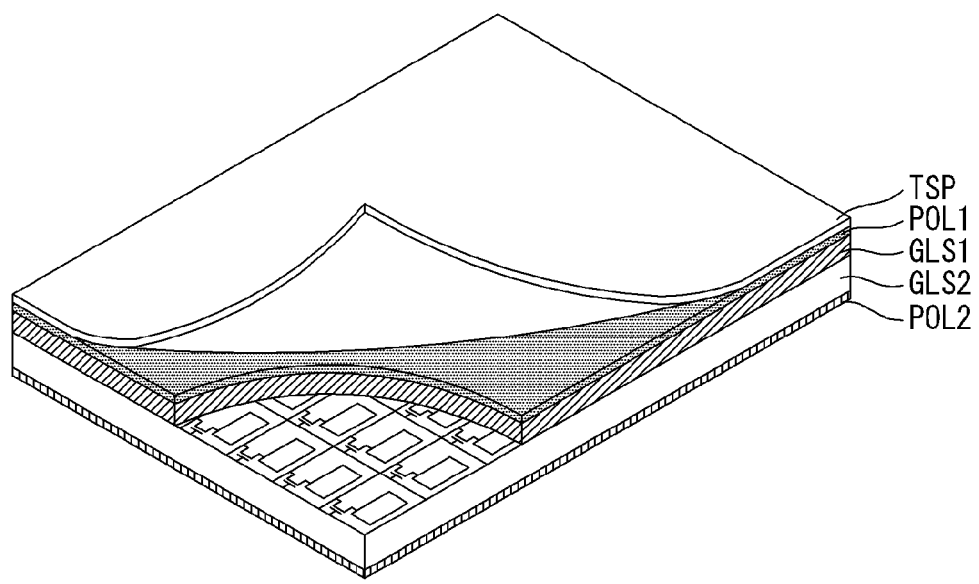
FIGS. 3 to 5 illustrate various combinations of a touch screen and a display panel according to an example embodiment of the invention.
Figure 4:
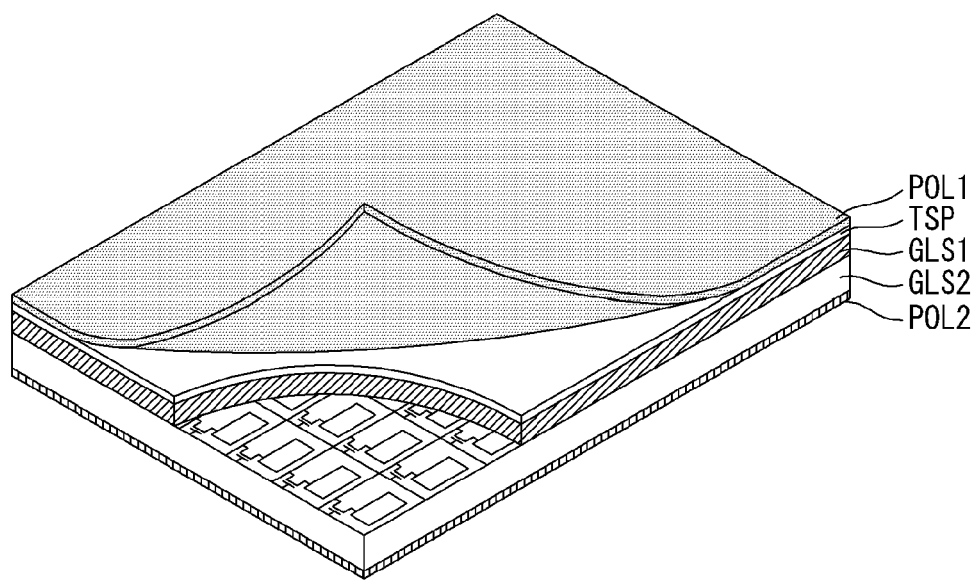
Figure 5:
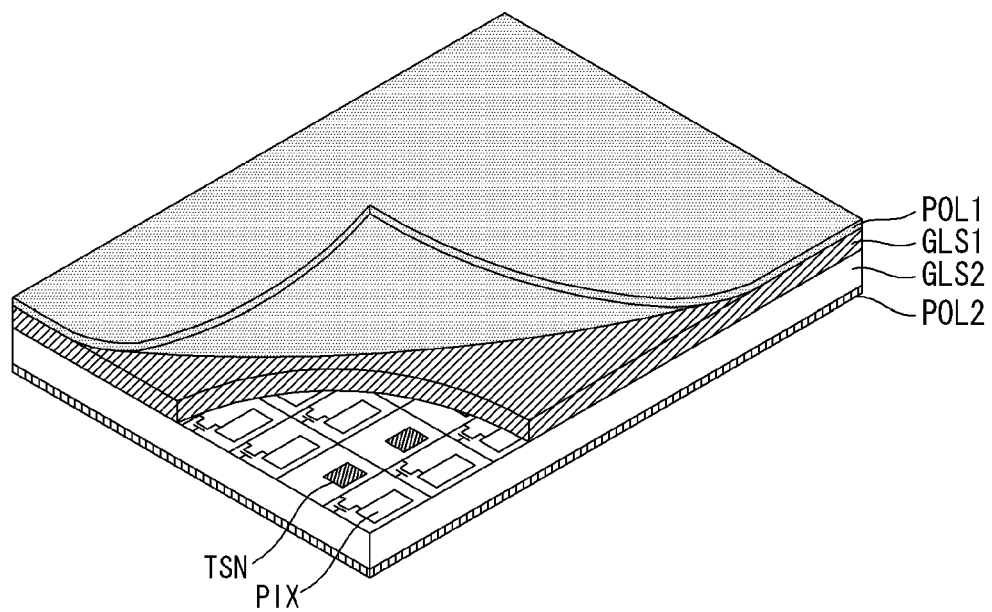

As shown in FIG. 3, the touch screen TSP may be attached to the upper polarizing plate POL1 of the display panel DIS. Alternatively, as shown in FIG. 4, the touch screen TSP may be formed between the upper polarizing plate POL1 and the upper substrate GLS1. Alternatively, as shown in FIG. 5, touch sensors TSN of the touch screen TSP may be formed on the substrate of the display panel DIS along with a pixel array of the display panel DIS. In FIG. 5, 'PIX' denotes the pixel electrode of the liquid crystal cell.

The touch screen TSP includes Tx lines T1 to Tj, where T is a positive integer less than n, Rx lines R1 to Ri crossing the Tx lines T1 to Tj, where 'i' is a positive integer less than m, and ixj touch sensors TSN formed at crossings of the Tx lines T1 to Tj and the Rx lines R1 to Ri.

Figure 6:
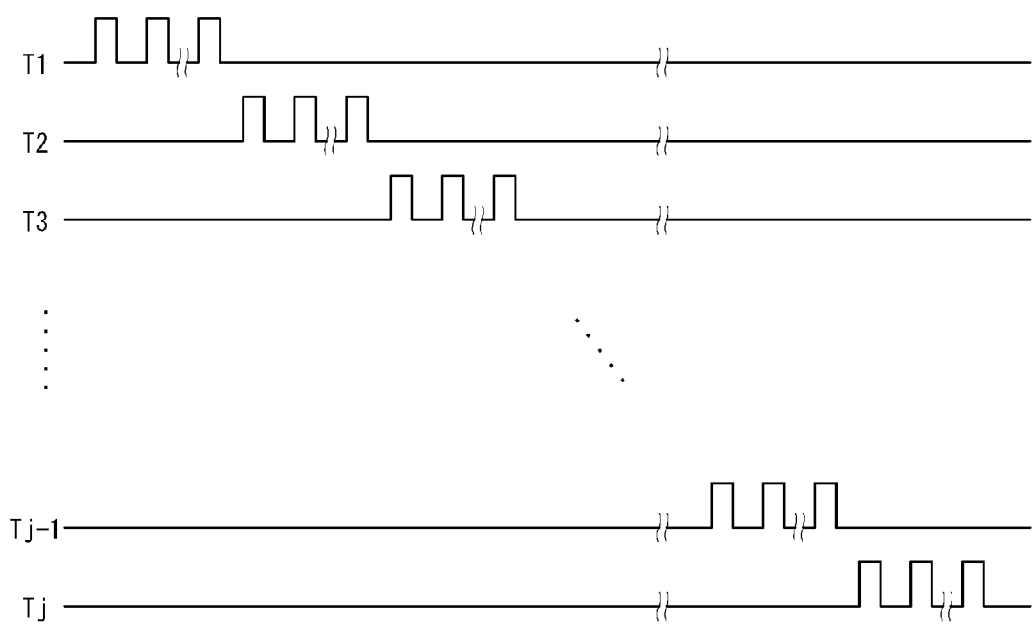
FIG. 6 illustrates an example of a driving signal supplied to Tx lines.

The touch screen driver 30 supplies a driving signal shown in FIG. 6 to the Tx lines T1 to Tj and receives charges of the touch sensors TSN through the Rx lines R1 to Ri in synchronization with the driving signal to sample voltages of the touch sensors TSN. The touch screen driver 30 then converts the sampled voltages of the touch sensors TSN into digital data and generates touch raw data. The driving signal supplied to the Tx lines T1 to Tj may be generated as a plurality of driving signal rows. The touch screen driver 30 executes a previously determined touch recognition algorithm and analyzes the touch raw data using the touch recognition algorithm. Hence, the touch screen driver 30 decides touch raw data, which is equal to or greater than a predetermined threshold value, as data of touch (or proximity) input positions and estimates coordinates of the touch (or proximity) input position data. The touch recognition algorithm may use any well-known algorithm. Touch coordinate data Txy output from the touch screen driver 30 is transmitted to the host system.

The host system may be implemented as one of a navigation system, a set-top box, a DVD player, a Blue-ray player, a personal computer (PC), a home theater system, a broadcasting receiver, and a phone system. The host system converts data of the input image into a data format suitable to display on the display panel DIS using a scaler embedded therein. Further, the host system runs an application associated with coordinate values of the touch coordinate data Txy received from the touch screen driver 30.

The touch screen driver 30 includes at least two integrated circuits. The integrated circuits are synchronized with each other and dividedly drive the touch screen TSP using a method shown in FIG. 7 or 12. The integrated circuits may dividedly drive the Tx lines T1 to Tj of the touch screen TSP or may dividedly drive the Rx lines R1 to Ri of the touch screen TSP. Alternatively, the integrated circuits may dividedly drive both the Tx lines T1 to Tj and the Rx lines R1 to Ri of the touch screen TSP.

Figure 7:
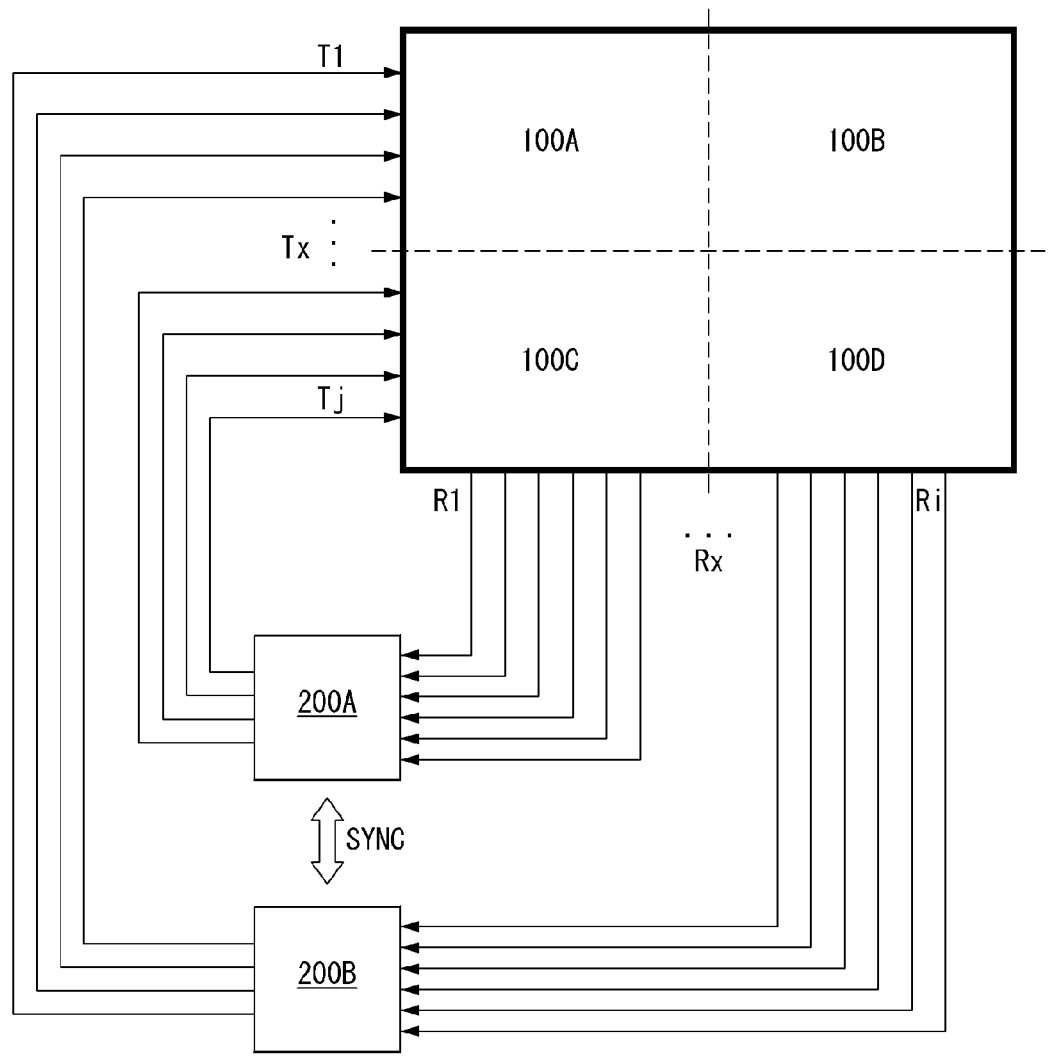
FIG. 7 illustrates configuration of a touch screen driver according to an example embodiment of the invention.
Figure 8:
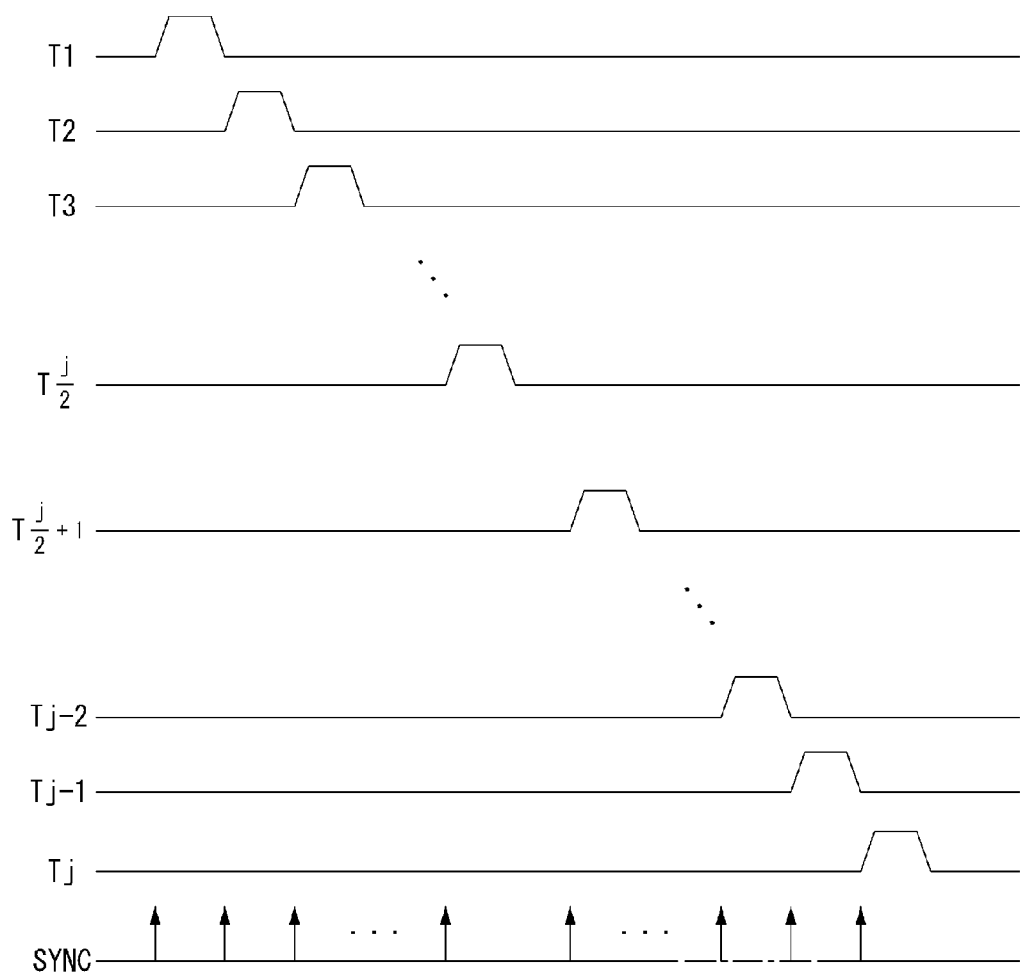
FIG. 8 is a waveform diagram showing a driving signal and a sync signal generated by a touch screen driver shown in FIG. 7.

FIG. 7 illustrates configuration of the touch screen driver 30 according to the embodiment of the invention. FIG. 8 is a waveform diagram showing a driving signal and a sync signal generated by the touch screen driver 30 shown in FIG. 7.

As shown in FIGS. 7 and 8, the touch screen driver 30 includes first and second integrated circuits 200A and 200B for dividedly driving the touch screen TSP which is virtually divided into four parts. The touch screen TSP is not physically divided and is divided into first to fourth areas 100A to 100D depending on a connection relationship between the first and second integrated circuits 200A and 200B and the touch screen TSP.

The first and second areas 100A and 100B are areas belonging to an upper half part of the touch screen TSP. The first and second areas 100A and 100B share the Tx lines T1 to Tj/2 formed in the upper half part of the touch screen TSP. The first area 100A includes the Rx lines R1 to Ri/2 formed in a left half part of the touch screen TSP, and the second area 100B includes the Rx lines R(i/2+1) to Ri formed in a right half part of the touch screen TSP.

The third and fourth areas 100C and 100D are areas belonging to a lower half part of the touch screen TSP. The third and fourth areas 100C and 100D share the Tx lines T(j/2+1) to Tj formed in the lower half part of the touch screen TSP. The third area 100C includes the Rx lines R1 to Ri/2 formed in the left half part of the touch screen TSP and shares the Rx lines R1 to Ri/2 with the first area 100A. The fourth area 100D includes the Rx lines R(i/2+1) to Ri formed in the right half part of the touch screen TSP and shares the Rx lines R(i/2+1) to Ri with the second area 100B.

The first integrated circuit 200A is connected to the Tx lines of a first group and the Rx lines of the first group and senses the touch sensors formed in the first and third areas 100A and 100C of the touch screen TSP. The second integrated circuit 200B is connected to the Tx lines of a second group and the Rx lines of the second group and senses the touch sensors formed in the second and fourth areas 100B and 100D of the touch screen TSP.

Each of the first and second integrated circuits 200A and 200B includes a Tx channel module, an Rx channel module, and a synchronization signal module. The Tx channel module supplies a driving signal to the Tx lines. As shown in FIG. 6, the driving signal may be sequentially supplied to the Tx lines, but is not limited thereto. The Rx channel module receives charges of the touch sensors through the Rx lines, samples voltages of the touch sensors, converts the sampled voltages of the touch sensors into digital data, and generates touch raw data. The synchronization signal module transmits a synchronization signal SYNC (refer to FIG. 8) generated by the first or second integrated circuit generating the driving signal to the second or first integrated circuit and synchronizes sensing operations of the first and second integrated circuits 200A and 200B, thereby preventing a sensing error.

Tx channels of the first integrated circuit 200A are connected to the Tx lines T(j/2+1) to Tj formed in the lower half part of the touch screen TSP. Rx channels of the first integrated circuit 200A are connected to the Rx lines R1 to Ri/2 formed in the left half part of the touch screen TSP. Thus, the first integrated circuit 200A supplies the driving signal to the Tx lines T(j/2+1) to Tj of the third and fourth areas 100C and 100D and receives the charges of the touch sensors through the Rx lines R1 to Ri/2 of the first and third areas 100A and 100C.

Tx channels of the second integrated circuit 200B are connected to the Tx lines T1 to Tj/2 formed in the upper half part of the touch screen TSP. Rx channels of the second integrated circuit 200B are connected to the Rx lines R(i/2+1) to Ri formed in the right half part of the touch screen TSP. Thus, the second integrated circuit 200B supplies the driving signal to the Tx lines T1 to Tj/2 of the first and second areas 100A and 100B and receives the charges of the touch sensors through the Rx lines R(i/2+1) to Ri of the second and fourth areas 100B and 100D.

Each time the driving signal is supplied to the Tx lines, the first and second integrated circuits 200A and 200B receive charges of the touch sensors through the Rx lines R1 to Ri in synchronization with the driving signal. For this, the first and second integrated circuits 200A and 200B perform bidirectional communication through the synchronization signal SYNC shown in FIG. 8. Hence, the first and second integrated circuits 200A and 200B are synchronized and driven. The synchronization signal SYNC is generated by the integrated circuit supplying the driving signal to the Tx lines and is transmitted to another integrated circuit.

The second integrated circuit 200B supplies the driving signal to the Tx lines T1 to Tj/2 crossing the first and second areas 100A and 100B of the touch screen TSP. The synchronization signal module of the second integrated circuit 200B supplies the synchronization signal SYNC synchronized with the driving signal supplied to the Tx lines T1 to Tj/2 to the first integrated circuit 200A. The synchronization signal SYNC may be synchronized with one of a rising edge and a falling edge of the driving signal supplied to the Tx lines T1 to Tj/2 or may be synchronized with both the rising edge and the falling edge of the driving signal supplied to the Tx lines T1 to Tj/2.

Each time the driving signal is supplied to the Tx lines T1 to Tj/2 in response to the synchronization signal SYNC, the first integrated circuit 200A receives charges of the touch sensors formed in the first area 100A through the Rx lines R1 to Ri/2, samples voltages of the touch sensors, converts the sampled voltages of the touch sensors into digital data, and generates touch raw data. At the same time as the first integrated circuit 200A, each time the driving signal is supplied to the Tx lines T1 to Tj/2, the second integrated circuit 200B receives charges of the touch sensors formed in the second area 100B through the Rx lines R(i/2+1) to Ri, samples voltages of the touch sensors, converts the sampled voltages of the touch sensors into digital data, and generates touch raw data.

The first integrated circuit 200A supplies the driving signal to the Tx lines T(j/2+1) to Tj crossing the third and fourth areas 100C and 100D of the touch screen TSP. The synchronization signal module of the first integrated circuit 200A supplies the synchronization signal SYNC synchronized with a rising edge of the driving signal supplied to the Tx lines T(j/2+1) to Tj to the second integrated circuit 200B.

Each time the driving signal is supplied to the Tx lines T(j/2+1) to Tj in response to the synchronization signal SYNC, the second integrated circuit 200B receives charges of the touch sensors formed in the fourth area 100D through the Rx lines R(i/2+1) to Ri, samples voltages of the touch sensors, converts the sampled voltages of the touch sensors into digital data, and generates touch raw data. At the same time as the second integrated circuit 200B, each time the driving signal is supplied to the Tx lines T(j/2+1) to Tj, the first integrated circuit 200A receives charges of the touch sensors formed in the third area 100C through the Rx lines R1 to Ri/2, samples voltages of the touch sensors, converts the sampled voltages of the touch sensors into digital data, and generates touch raw data.

Figure 9:
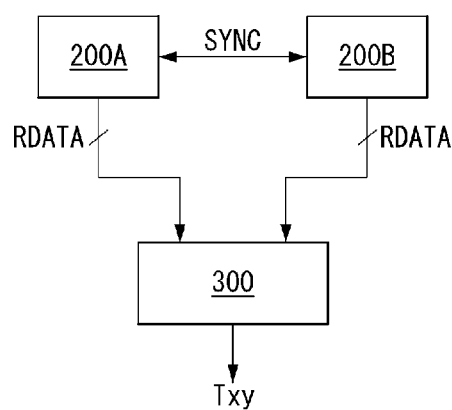
FIGS. 9 to 11 illustrate various embodiments of a touch recognition module.
Figure 10:
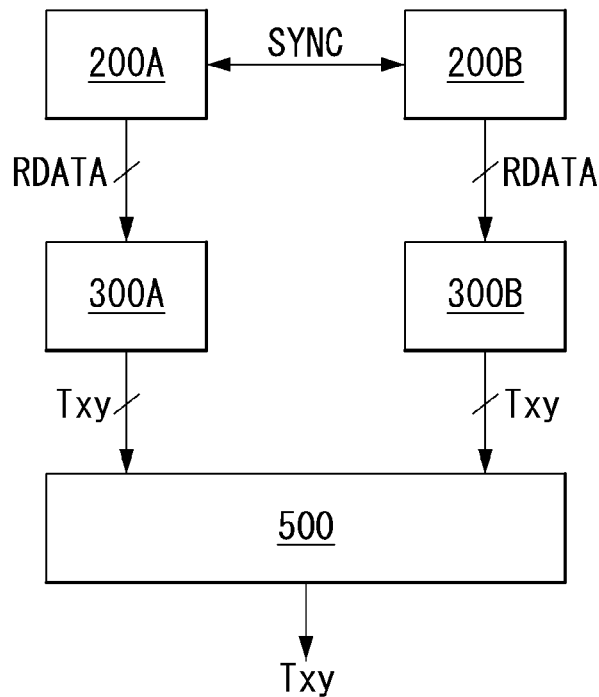
Figure 11:
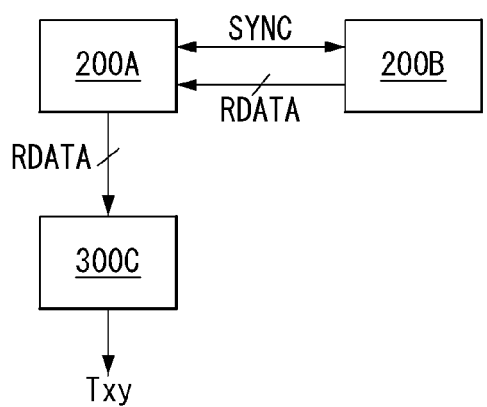

The touch screen driver 30 further includes a touch recognition module shown in FIGS. 9 to 11. The touch recognition module executes the touch recognition algorithm and analyzes the touch raw data received from each of the first and second integrated circuits 200A and 200B using the touch recognition algorithm to estimate touch (or proximity) input positions. Further, the touch recognition module decides touch raw data, which is equal to or greater than a predetermined threshold value, as data of the touch (or proximity) input positions and estimates coordinates of the touch (or proximity) input position data. Further, the touch recognition module assigns an identification code to each of the touch (or proximity) input positions and recognizes a multi-touch.

FIGS. 9 to 11 illustrate various embodiments of the touch recognition module.

As shown in FIG. 9, a touch recognition module 300 analyzes touch raw data RDATA received from each of the first and second integrated circuits 200A and 200B and estimates coordinates of touch (or proximity) input positions to output touch coordinate data Txy including coordinate information. The touch recognition module 300 may include an offset correction algorithm for correcting a deviation between output offsets of the integrated circuits 200A and 200B. The touch recognition module 300 may be embedded in one of the integrated circuits 200A and 200B.

As shown in FIG. 10, the touch recognition module includes first and second touch recognition modules 300A and 300B. The first touch recognition module 300A analyzes touch raw data RDATA received from the first integrated circuit 200A and estimates coordinates of touch (or proximity) input positions to output touch coordinate data Txy including coordinate information. The second touch recognition module 300B analyzes touch raw data RDATA received from the second integrated circuit 200B and estimates coordinates of touch (or proximity) input positions to output touch coordinate data Txy including coordinate information. The first touch recognition module 300A may be embedded in the first integrated circuit 200A, and the second touch recognition module 300B may be embedded in the second integrated circuit 200B.

The touch screen driver 30 further includes a data synchronization module 500 connected to the first and second touch recognition modules 300A and 300B. The data synchronization module 500 synchronizes the touch coordinate data Txy output from the first and second touch recognition modules 300A and 300B and transmits the synchronized touch coordinate data Txy to the host system. The data synchronization module 500 may include an offset correction algorithm for correcting a deviation between output offsets of the integrated circuits 200A and 200B.

As shown in FIG. 11, one of the first and second integrated circuits 200A and 200B may transmit the touch raw data to the other integrated circuit. In this instance, the other integrated circuit receiving the touch raw data from the one integrated circuit synchronizes the touch raw data and transmits the synchronized touch raw data to a touch recognition module 300C. For example, the first integrated circuit 200A receives touch raw data RDATA output from the second integrated circuit 200B and synchronizes the received touch raw data RDATA with touch raw data RDATA generated by the first integrated circuit 200A. The first integrated circuit 200A may transmit the synchronized touch raw data RDATA to the touch recognition module 300C.

The touch recognition module 300C analyzes the touch raw data RDATA received from the first integrated circuit 200A and estimates coordinates of touch (or proximity) input positions to output touch coordinate data Txy including coordinate information. The touch recognition module 300C may be embedded in the first integrated circuit 200A.

Figure 12:
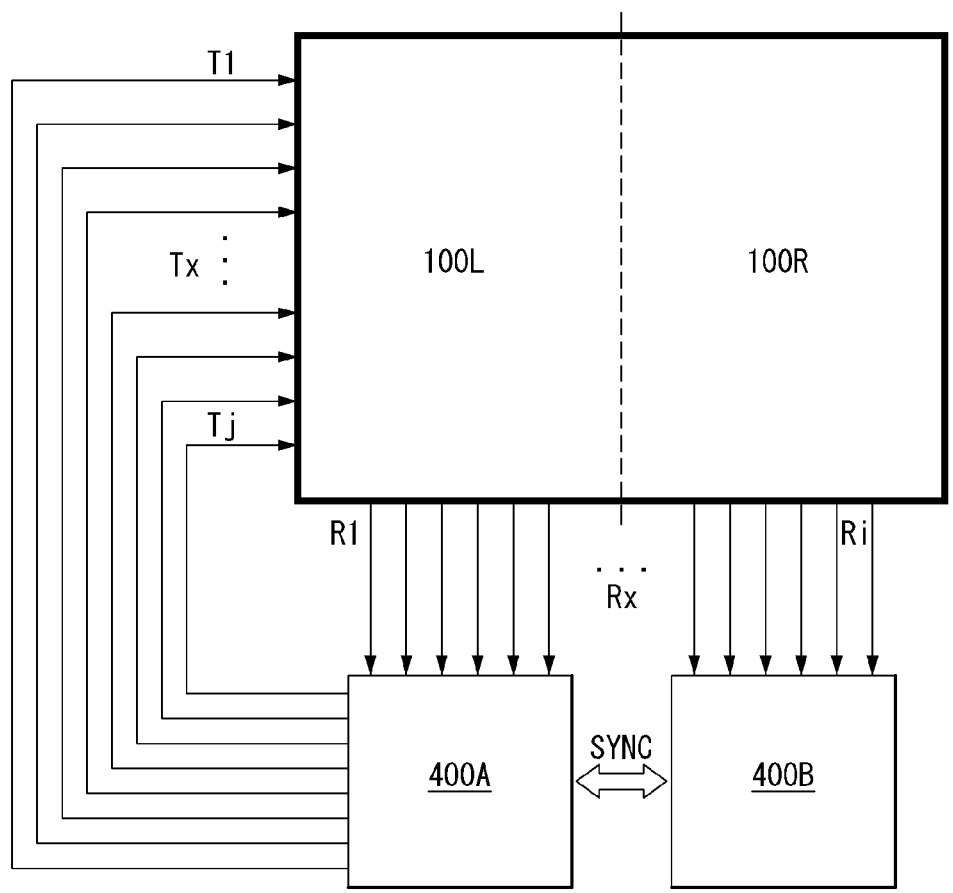
FIG. 12 illustrates another configuration of a touch screen driver according to an example embodiment of the invention.
Figure 13:
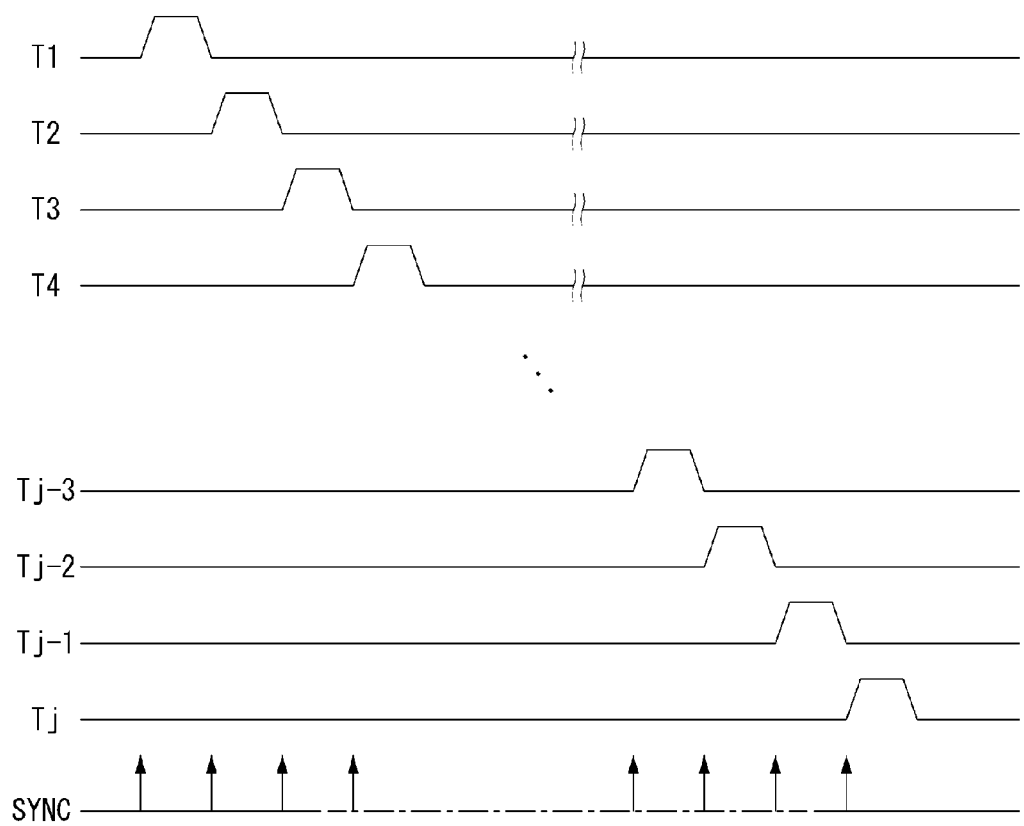
FIG. 13 is a waveform diagram showing a driving signal and a sync signal generated by a touch screen driver shown in FIG. 12.

FIG. 12 illustrates another configuration of the touch screen driver 30 according to the embodiment of the invention. FIG. 13 is a waveform diagram showing a driving signal and a sync signal generated by the touch screen driver 30 shown in FIG. 12.

As shown in FIGS. 12 and 13, the touch screen driver 30 includes first and second integrated circuits 400A and 400B for dividedly driving the touch screen TSP which is virtually divided into two parts. The touch screen TSP is not physically divided and is divided into first and second areas 100L and 100R depending on a connection relationship between the first and second integrated circuits 400A and 400B and the touch screen TSP.

The first area 100L corresponds to a left half part of the touch screen TSP, and the second area 100R corresponds to a right half part of the touch screen TSP. The first and second areas 100L and 100R share the Tx lines T1 to Tj with each other. The first area 100L includes the Rx lines R1 to Ri/2 formed in the left half part of the touch screen TSP. The second area 100R includes the Rx lines R(i/2+1) to Ri formed in the right half part of the touch screen TSP.

The first integrated circuit 400A includes a Tx channel module, an Rx channel module, and a synchronization signal module. The Tx channel module of the first integrated circuit 400A supplies a driving signal shown in FIG. 6 to the Tx lines T1 to Tj. The Rx channel module of the first integrated circuit 400A receives charges of the touch sensors through the Rx lines R1 to Ri/2, samples voltages of the touch sensors, converts the sampled voltages of the touch sensors into digital data, and generates touch raw data RDATA. The synchronization signal module of the first integrated circuit 400A transmits a synchronization signal SYNC (refer to FIG. 8) synchronized with the driving signal supplied to the Tx lines T1 to Tj to the second integrated circuit 400B and synchronizes sensing operations of the first and second integrated circuits 400A and 400B.

Tx channels of the first integrated circuit 400A are connected to the Tx lines T1 to Tj of the touch screen TSP. Rx channels of the first integrated circuit 400A are connected to the Rx lines R1 to Ri/2 formed in the left half part of the touch screen TSP. Thus, the first integrated circuit 400A supplies the driving signal to the Tx lines T1 to Tj and receives the charges of the touch sensors through the Rx lines R1 to Ri/2. The first integrated circuit 400A generates a driving signal of the synchronization signal SYNC synchronized with each of the driving signals supplied to the Tx lines T1 to Tj and transmits the driving signal of the synchronization signal SYNC to the second integrated circuit 400B.

The second integrated circuit 400B includes an Rx channel module and a synchronization signal module. The second integrated circuit 400B does not require a Tx channel module. The Rx channel module of the second integrated circuit 400B receives charges of the touch sensors through the Rx lines R(i/2+1) to Ri, samples voltages of the touch sensors, converts the sampled voltages of the touch sensors into digital data, and generates touch raw data RDATA. The synchronization signal module of the second integrated circuit 400B receives the synchronization signal SYNC from the first integrated circuit 400A and synchronizes the driving signal of each Tx channel output from the first integrated circuit 400A with the Rx channel module of the second integrated circuit 400B in response to the synchronization signal SYNC.

The first integrated circuit 400A supplies the driving signal to the Tx lines T1 to Tj crossing the first and second areas 100L and 100R of the touch screen TSP. The synchronization signal module of the first integrated circuit 400A supplies the synchronization signal SYNC synchronized with the driving signal supplied to the Tx lines T1 to Tj to the second integrated circuit 400B. The driving signal of the synchronization signal SYNC may be synchronized with a rising edge of the driving signal supplied to the Tx lines T1 to Tj or may be synchronized with both the rising edge and a falling edge of the driving signal supplied to the Tx lines T1 to Tj.

Each time the driving signal is supplied to the Tx lines T1 to Tj, the first integrated circuit 400A receives charges of the touch sensors formed in the first area 100L through the Rx lines R1 to Ri/2, samples voltages of the touch sensors, converts the sampled voltages of the touch sensors into digital data, and generates touch raw data. At the same time as the first integrated circuit 400A, each time the driving signal is supplied to the Tx lines T1 to Tj in response to the synchronization signal SYNC, the second integrated circuit 400B receives charges of the touch sensors formed in the second area 100R through the Rx lines R(i/2+1) to Ri, samples voltages of the touch sensors, converts the sampled voltages of the touch sensors into digital data, and generates touch raw data.

The first and second integrated circuits 400A and 400B are connected to touch recognition modules 300 and 300A to 300C shown in FIGS. 9 to 11. Since the touch recognition modules 300 and 300A to 300C are substantially the same as those described above, a further description may be briefly made or may be entirely omitted.

In another embodiment, integrated circuits may dividedly drive the Tx lines, and one of the integrated circuits may be connected to all of the Rx lines and may receive charges of the touch sensors through the Rx lines. In this instance, one of the integrated circuits may not require an Rx channel module.

The embodiment of the invention described the two integrated circuits for dividedly driving the touch screen TSP, but is not limited thereto. Two or more integrated circuits may be used for the embodiment of the invention.

As described above, the embodiment of the invention dividedly drives the touch screen using the integrated circuits each having a relatively small number of channels and synchronizes the operations of the integrated circuits with each other, thereby preventing the sensing error when the touch screen is dividedly driven. As a result, the embodiment of the invention may normally drive the touch screen having the relatively large number of channels using the integrated circuits having the relatively small number of channels.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen driver for driving a touch screen, which includes Tx lines, Rx lines and touch sensors formed at crossings of the Tx lines and the Rx lines, the touch screen driver comprising:
   a plurality of integrated circuits including a first integrated circuit and a second integrated circuit, and configured to dividedly drive the touch screen,
   wherein one of the plurality of integrated circuits, which generates a driving signal to be supplied to the Tx lines, transmits a synchronization signal synchronized with a rising edge of the driving signal to other integrated circuit, wherein the other integrated circuit receiving the synchronization signal receives charges of the touch sensors through the Rx lines in response to the synchronization signal;
   a first touch recognition module configured to analyze touch raw data received from the first integrated circuit estimate coordinates of touch input positions and output first touch coordinate data;
   a second touch recognition module configured to analyze touch raw data received from the second integrated circuit, estimate coordinates of touch input positions, and output second touch coordinate data, wherein the first touch recognition module is embedded in the first integrated circuit and the second touch recognition module is embedded in the second integrated circuit; and
   a data synchronization module configured to synchronize the first touch coordinate data and the second touch coordinate data output respectively from the first touch recognition module and the second touch recognition module, and transmit the synchronized touch coordinate data to a host system.

2. The touch screen driver of claim 1, wherein the first integrated circuit is connected to Tx lines of a first group which are divided from the Tx lines, is connected to Rx lines of a first group which are divided from the Rx lines, supplies the driving signal to the Tx lines of the first group, and at the same time, transmits the synchronization signal to the second integrated circuit, and
   wherein the second integrated circuit is connected to Tx lines of a second group which are divided from the Tx lines, is connected to Rx lines of a second group which are divided from the Rx lines, supplies the driving signal to the Tx lines of the second group, and at the same time, transmits the synchronization signal to the first integrated circuit.

3. The touch screen driver of claim 2, wherein each time the driving signal is supplied to the Tx lines of the first group, the first integrated circuit receives charges of the touch sensors formed in a first area of the touch screen through the Rx lines of the first group, samples voltages of the touch sensors in the first area, converts the sampled voltages of the touch sensors in the first area into a first digital data, and generates a first touch raw data, and
   wherein each time the driving signal is supplied to the Tx lines of the first group in response to the synchronization signal from the first integrated circuit, the second integrated circuit receives charges of the touch sensors formed in a second area of the touch screen through the Rx lines of the second group, samples voltages of the touch sensors in the second area, converts the sampled voltages of the touch sensors in the second area into a second digital data, and generates a second touch raw data.

4. The touch screen driver of claim 3, wherein each time the driving signal is supplied to the Tx lines of the second group in response to the synchronization signal from the second integrated circuit, the first integrated circuit receives charges of the touch sensors formed in a third area of the touch screen through the Rx lines of the first group, samples voltages of the touch sensors in the third area, converts the sampled voltages of the touch sensors in the third area into a third digital data, and generates a third touch raw data, and
   wherein each time the driving signal is supplied to the Tx lines of the second group, the second integrated circuit receives charges of the touch sensors formed in a fourth area of the touch screen through the Rx lines of the second group, samples voltages of the touch sensors in the fourth area, converts the sampled voltages of the touch sensors in the fourth area into a fourth digital data, and generates a fourth touch raw data.

5. The touch screen driver of claim 4, wherein
   the first touch recognition module is configured to analyze the first and third touch raw data received from the first integrated circuit, estimate coordinates of a first touch input position, and output the first touch coordinate data; and
   the second touch recognition module is configured to analyze the second and fourth touch raw data received from the second integrated circuit, estimate coordinates of a second touch input position, and output the second touch coordinate data.

6. The touch screen driver of claim 4, wherein the first integrated circuit receives the second and fourth touch raw data output from the second integrated circuit and synchronizes the received second and fourth touch raw data with the first and third touch raw data generated by the first integrated circuit.

7. The touch screen driver of claim 6, wherein the first touch recognition module is configured to analyze the synchronized first and fourth touch raw data received from the first integrated circuit, estimate coordinates of the first touch input position, and output the first touch coordinate data.

8. The touch screen driver of claim 1,
wherein the first integrated circuit is connected to the Tx lines, is connected to Rx lines of a first group which are divided from the Rx lines, supplies the driving signal to the Tx lines, and at the same time, transmits the synchronization signal to the second integrated circuit, and
wherein the second integrated circuit is connected to Rx lines of a second group which are divided from the Rx lines.

9. The touch screen driver of claim 8, wherein each time the driving signal is supplied to the Tx lines, the first integrated circuit receives charges of the touch sensors formed in a first area of the touch screen through the Rx lines of the first group, samples voltages of the touch sensors in the first area, converts the sampled voltages of the touch sensors in the first area into a first digital data, and generates a first touch raw data, and
wherein each time the driving signal is supplied to the Tx lines in response to the synchronization signal from the first integrated circuit, the second integrated circuit receives charges of the touch sensors formed in a second area of the touch screen through the Rx lines of the second group, samples voltages of the touch sensors in the second area, converts the sampled voltages of the touch sensors in the second area into a second digital data, and generates a second touch raw data.

10. The touch screen driver of claim 9, wherein the second touch recognition module is configured to analyze the touch raw data received from the second integrated circuit, estimate coordinates of the second touch input position, and output the second touch coordinate data.

11. The touch screen driver of claim 9, wherein the first integrated circuit receives the second touch raw data output from the second integrated circuit and synchronizes the received second touch raw data with the first touch raw data generated by the first integrated circuit.

12. A display device comprising a touch screen which includes Tx lines, Rx lines and touch sensors formed at crossings of the Tx lines and the Rx lines, the display device comprising:
a plurality of integrated circuits including a first integrated circuit and a second integrated circuit configured to dividedly drive the touch screen,
wherein one of the plurality of integrated circuits, which generates a driving signal to be supplied to the Tx lines, transmits a synchronization signal synchronized with a rising edge of the driving signal to other integrated circuit, wherein the other integrated circuit receiving the synchronization signal receives charges of the touch sensors through the Rx lines in response to the synchronization signal;
a first touch recognition module configured to analyze touch raw data received from the first integrated circuit, estimate coordinates of touch input positions, and output first touch coordinate data;
a second touch recognition module configured to analyze touch raw data received from the second integrated circuit, estimate coordinates of touch input positions, and output second touch coordinate data, wherein the first touch recognition module is embedded in the first integrated circuit and the second touch recognition module is embedded in the second integrated circuit; and
a data synchronization module configured to synchronize the first and second touch coordinate data output respectively from the first and second touch recognition modules, and transmits the synchronized touch coordinate data to a host system.

13. The display device of claim 12, wherein
the first integrated circuit is connected to Tx lines of a first group which are divided from the Tx lines, is connected to Rx lines of a first group which are divided from the Rx lines, supplies the driving signal to the Tx lines of the first group, and at the same time, transmits the synchronization signal to the second integrated circuit, and
wherein the second integrated circuit is connected to Tx lines of a second group which are divided from the Tx lines, is connected to Rx lines of the a second group which are divided from the Rx lines, supplies the driving signal to the Tx lines of the second group, and at the same time, transmits the synchronization signal to the first integrated circuit.

14. The display device of claim 13, wherein each time the driving signal is supplied to the Tx lines of the first group, the first integrated circuit receives charges of the touch sensors formed in a first area of the touch screen through the Rx lines of the first group, samples voltages of the touch sensors in the first area, converts the sampled voltages of the touch sensors in the first area into a first digital data, and generates a first touch raw data, and
wherein each time the driving signal is supplied to the Tx lines of the first group in response to the synchronization signal from the first integrated circuit, the second integrated circuit receives charges of the touch sensors forming in a second area of the touch screen through the Rx lines of the second group, samples voltages of the touch sensors in the second area, converts the sampled voltages of the touch sensors in the second area into a second digital data, and generates a second touch raw data.

15. The display device of claim 14, wherein each time the driving signal is supplied to the Tx lines of the second group in response to the synchronization signal from the second integrated circuit, the first integrated circuit receives charges of the touch sensors formed in a third area of the touch screen through the Rx lines of the first group, samples voltages of the touch sensors in the third area, converts the sampled voltages of the touch sensors in the third area into a third digital data, and generates a third touch raw data, and
wherein each time the driving signal is supplied to the Tx lines of the second group, the second integrated circuit receives charges of the touch sensors formed in a fourth area of the touch screen through the Rx lines of the second group, samples voltages of the touch sensors in the fourth area, converts the sampled voltages of the touch sensors in the fourth area into a fourth digital data, and generates a fourth touch raw data.

16. The display device of claim 15, wherein the first integrated circuit receives the second and fourth touch raw data output from the second integrated circuit and synchronizes the received second and fourth touch raw data with the first and third touch raw data generated by the first integrated circuit.

* * * * *